(12) United States Patent
Chernoff et al.

(10) Patent No.: US 6,827,174 B2
(45) Date of Patent: Dec. 7, 2004

(54) DRIVER CONTROL INPUT DEVICE HAVING OPPOSING MOVABLE POSTS FOR STEERING

(75) Inventors: Adrian B. Chernoff, Royal Oak, MI (US); Joseph F. Szczerba, Grand Blanc, MI (US); Julien Montousse, Madison Heights, MI (US)

(73) Assignee: General Motors Corporation, Detroit, MI (US)

( * ) Notice: Subject to any disclaimer, the term of this patent is extended or adjusted under 35 U.S.C. 154(b) by 157 days.

(21) Appl. No.: 10/337,255

(22) Filed: Jan. 6, 2003

(65) Prior Publication Data

US 2004/0129486 A1 Jul. 8, 2004

(51) Int. Cl.[7] ............................................... B60K 26/00
(52) U.S. Cl. ...................... 180/333; 180/6.48; 180/402; 74/469; 74/471 XY
(58) Field of Search ................................ 180/315, 316, 180/321, 402, 332, 333, 334, 336, 6.48; 74/469, 471 XY (56) References Cited

U.S. PATENT DOCUMENTS

| | | | |
|---|---|---|---|
| 5,366,281 A | | 11/1994 | Littlejohn ........................ 303/3 |
| 5,823,636 A | | 10/1998 | Parker et al. .................... 303/3 |
| 5,845,735 A | * | 12/1998 | Muller et al. ................ 180/322 |
| 6,039,142 A | * | 3/2000 | Eckstein et al. ............. 180/333 |
| 6,095,268 A | * | 8/2000 | Jones, Jr. ...................... 180/6.5 |
| 6,176,341 B1 | | 1/2001 | Ansari .......................... 180/402 |
| 6,208,923 B1 | | 3/2001 | Hommel ........................ 701/42 |
| 6,219,604 B1 | | 4/2001 | Dilger et al. .................. 701/41 |
| 6,267,195 B1 | * | 7/2001 | Takahasi et al. ............. 180/316 |
| 6,305,758 B1 | | 10/2001 | Hageman et al. ........ 303/115.2 |
| 6,318,494 B1 | | 11/2001 | Pattok .......................... 180/402 |
| 6,370,460 B1 | | 4/2002 | Kaufmann et al. ........... 701/41 |
| 6,390,565 B2 | | 5/2002 | Riddiford et al. ............... 303/3 |
| 6,394,218 B1 | | 5/2002 | Heitzer ........................ 180/402 |
| 6,474,688 B1 | * | 11/2002 | Bogren et al. .............. 280/771 |
| 6,550,560 B2 | * | 4/2003 | Carleton ..................... 180/272 |
| 6,572,129 B1 | * | 6/2003 | Bean ........................... 280/234 |
| 6,585,073 B2 | * | 7/2003 | Lorenz ........................ 180/332 |
| 6,604,757 B1 | * | 8/2003 | Huang ......................... 280/778 |
| 6,634,454 B2 | * | 10/2003 | Sugitani et al. ............. 180/402 |
| 6,712,164 B2 | * | 3/2004 | Chernoff et al. ........... 180/65.1 |
| 6,726,438 B2 | * | 4/2004 | Chernoff et al. ............ 414/802 |
| 6,731,020 B2 | * | 5/2004 | Burr et al. | |

* cited by examiner

Primary Examiner—Paul N. Dickson
Assistant Examiner—Toan C To
(74) Attorney, Agent, or Firm—Kathryn A. Marra (57) ABSTRACT

A driver control input device includes left and right control posts each having a hand grip. The control posts are movable forwardly and rearwardly and are sufficiently linked together such that forward movement of one control post will result in an equal and opposite rearward movement of the other control post to facilitate sending non-mechanical steering signals to a steer-by-wire system to which the control input device is attached. Accelerator demand input mechanisms and braking demand input mechanisms may also be positioned on the hand grips for generating non-mechanical acceleration and braking signals.

19 Claims, 5 Drawing Sheets

DRIVER CONTROL INPUT DEVICE HAVING OPPOSING MOVABLE POSTS FOR STEERING

TECHNICAL FIELD

The present invention relates to a driver control input device for providing steering, acceleration and braking signals in a drive-by-wire system.

BACKGROUND OF THE INVENTION

The implementation of drive-by-wire technology in the automotive industry (e.g. steer-by-wire, brake-by-wire, throttle-by-wire, shift-by-wire, etc.) is a result of continuing efforts to reduce cost, increase reliability, and reduce weight.

In drive-by-wire systems, mechanical devices with linkages and mechanical connections are being replaced with sensors, actuators and electronics. For example, in a conventional steering system, which consists of a steering wheel, a steering column, a power assisted rack and pinion system, and tie rods, the driver turns a steering wheel which, through the various mechanical components, causes the road wheels of the vehicle to turn. In a steer-by-wire system, a number of the mechanical components between the steering wheel and the road wheels of the vehicle are replaced with a sensor at the steering wheel and both sensors and actuators at the road wheels. In a steer-by-wire system, the rotation of the steering wheel is measured by the sensor. This rotation measurement is processed by the electronics to generate command signals for the actuators to turn the road wheels.

Drive-by-wire modules may reduce assembly time and cost and result in an improved driver interface because the elimination of mechanical connections to the steering column give engineers more flexibility in designing the driver interface with regard to location, type and performance. Vehicle designers will also have more flexibility in the placement of hardware under the hood and in the interior to support alternative power trains, enhanced styling, and improved interior functionality.

Without a steering column, there is no need to provide an adjustable seat, so seat content may be reduced. The absence of the steering column may also enable integrated vehicle stability control systems, collision avoidance systems, and automated driving systems.

Drive-by-wire technology may also increase packaging flexibility, simplify assembly, enable tunable steering feel, and advanced vehicle control.

SUMMARY OF THE INVENTION

A vehicle driver control input device in accordance with the invention is provided for use in a vehicle drive-by-wire system for steering, accelerating and braking a vehicle. The invention also contemplates the use of the driver control input device in a driving simulator, aircraft, video game, etc.

Advantageously, the driver control input device includes left and right control posts each having a hand grip. The control posts are movable forwardly and rearwardly and are sufficiently linked together such that forward movement of one control post will result in an equal and opposite rearward movement of the other control post to facilitate sending non-mechanical steering signals to a steer-by-wire system to which the control input device is attached.

Preferably, at least one of the hand grips on the left and right control posts includes an accelerator demand input mechanism to facilitate sending acceleration signals to an energy conversion system.

Also, preferably at least one of the hand grips includes a braking demand input mechanism to facilitate sending braking signals to a brake-by-wire system.

The left and right control posts may be pivotally mounted for pivotal movement in the forward and rearward directions, and operatively engaged with a transducer to convert the pivotal movement into steering signals. Alternatively, the control posts may be slidably mounted for sliding movement along first and second tracks in the forward and rearward directions, and operatively engaged with a transducer to convert the sliding movement into steering signals.

The accelerator demand input mechanism may include an accelerator button positioned on an upper portion of the hand grips. The braking demand input mechanism may include a braking button positioned on a forward portion of the hand grips. These buttons may be replaced by levers, compression sensors, etc., and may be positioned anywhere on the hand grips. For example, the accelerator buttons may be positioned for operation by a user's thumb.

Preferably, a driver's seat is positioned between the left and right control posts for driving a vehicle to which the driver control input device is attached.

The magnitude of vehicle braking or acceleration signals may be relative to the force applied to the braking or acceleration button or lever. Preferably, when a desired speed is achieved, the accelerator buttons may be released, and the vehicle's speed will be maintained, such as by cruise control. In other words, the vehicle would maintain a steady speed unless acceleration or braking signals are being sent by a driver.

The brake actuation buttons or acceleration buttons may be linked together such that depressing either brake button or acceleration button, left or right, will brake or accelerate the vehicle. Active force feedback is also utilized to simulate vehicle dynamic conditions and enhance driving performance.

Preferably, the hand grips are fully adjustable to optimize user comfort.

The above objects, features and advantages, and other objects, features and advantages of the present invention are readily apparent from the following detailed description of the best modes for carrying out the invention when taken in connection with the accompanying drawings.

DESCRIPTION OF THE PREFERRED EMBODIMENTS

Figure 1:
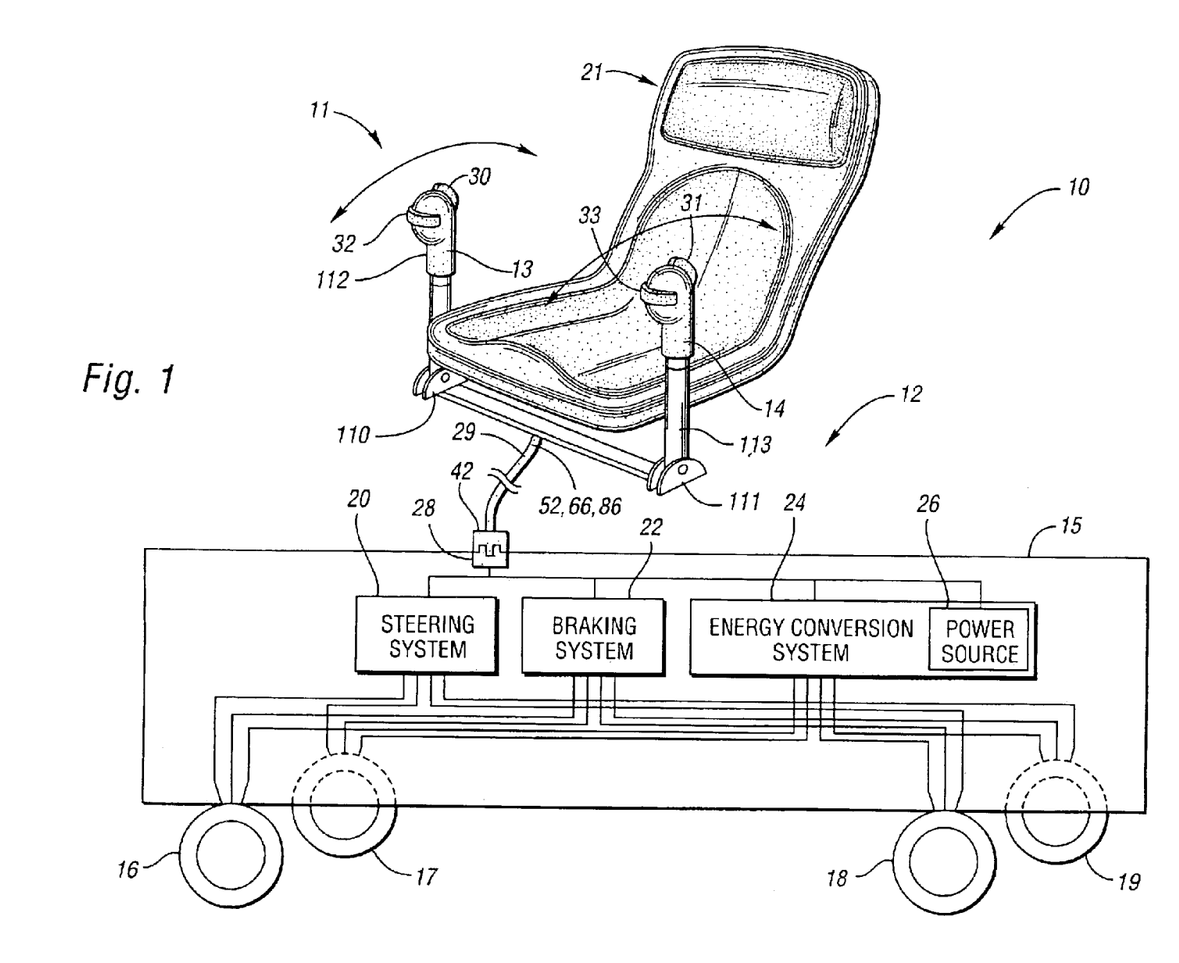
FIG. 1 is a schematic illustration (not to scale) of a vehicle incorporating a driver control input device in accordance with the invention.

Referring to FIG. 1, a vehicle 10 in accordance with the invention includes a vehicle drive system 12 and a chassis 15. The vehicle drive system 12 includes a driver control input device 11 which is operatively connected with a steering system 20, braking system 22 and energy conversion system 24. The chassis 15 includes a frame that has four wheels 16, 17, 18, 19 that are operable with respect to the chassis 15. Those skilled in the art will recognize materials and fastening methods suitable for attaching the wheels 16, 17, 18 and 19 to the chassis 15.

The vehicle 10 is preferably an automobile, but the invention also contemplates that the control input device may be useful in a tractor, fork lift, airplane, driving simulation device, video game, etc.

As shown, the driver control input device 11 includes first and second hand grips 13, 14 that are pivotally supported with respect to support members 110, 111 on pivotable posts 112, 113, respectively. The posts 112, 113 may be mounted on a vehicle floor, armrest, seat, console, door, roof, etc. A seat 21 is positioned between the hand grips 13, 14. The first and second hand grips 13, 14 are pivotable with respect to the support members 110, 111 to generate non-mechanical steering control signals 52 via a transducer which is operatively positioned between the pivotable posts 112, 113 and the support members 110, 111. The posts 112,113 are preferably interconnected or synchronized so that forward movement of one control post will result in an equal and opposite rearward movement of the other control post. The posts may be interconnected mechanically, such as by a gearing arrangement including bevel gears or the like to cause the posts to move in opposing directions. Alternatively, the post movement may be synchronized electronically with a sensor to sense the angular positions or longitudinal positions of the posts, and motors configured to actuate the posts to opposite angular or longitudinal positions. It may be desirable to provide rearward motion not equal to, but proportional to, forward movement. For example, the rearward motion may be 60% of forward motion for driver comfort. The steering control signals 52 are sent through the connector wire 29, through connector ports 42, 28 to the steering system 20.

The first and second hand grips 13, 14 include accelerator demand input mechanisms 30, 31 which are operative to provide, via a transducer, energy conversion control signals 86 through the connector wire 29 and connector ports 42, 28 to the energy conversion system 24.

The first and second hand grips 13, 14 also include braking demand input mechanisms 32, 33 which are operative to provide electrical braking control signals 66 through the connector wire 29 and connector ports 42, 28 to the braking system 22.

The steering system 20, braking system 22 and energy conversion system 24 are each mounted to a frame of the chassis 15 and are responsive to non-mechanical control signals, as described above. The energy conversion system 24 is connected to a power source 26. Embodiments of such systems are described subsequently with respect to FIGS. 2-4.

The chassis 15 includes a frame which provides a rigid structure to which the steering system 20, braking system 22 and energy conversion system 24 as well as the wheels 16, 17, 18, 19 are mounted, as shown schematically in FIG. 1, and is configured to support an attached body. A person of ordinary skill in the art will recognize that the chassis 15 can take many different forms. For example, the chassis 15 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan", wherein integrated rails and cross members are formed in sheets of metal or other suitable material, with other formations to accommodate various system components. The structural frame may also be integrated with various vehicle components. Of course, the above description is merely exemplary, and the invention may alternatively be useful in a body-on-frame assembly, body-frame integral assembly, non-passenger vehicle, such as a forklift, etc.

As described previously, the chassis 15 includes the connector port 28, also referred to as a drive-by-wire connector port, that is mounted with respect to the chassis 15 and operably connected to the steering system 20, braking system 22 and energy conversion system 24. Persons skilled in the art will recognize various methods for mounting the connector port 28 to the chassis 15. In the preferred embodiment, the connector port 28 is located on a top face of the chassis 15, in reasonably close proximity to the driver control input device 11.

The connector port 28 of the preferred embodiment may perform multiple functions, or select combinations thereof. First, the connector port 28 may function as an electrical power connector, i.e., it may be configured to transfer electrical energy generated by components on the vehicle 10 to the operator interface or other non-frame destination. Second, the connector port 28 may function as a control signal receiver, i.e., a device configured to transfer non-mechanical control signals from a non-vehicle source, such as the driver control input device 11, to controlled systems including the steering system 20, braking system 22 and energy conversion system 24. Third, the connector port 28 may function as a feedback signal conduit through which feedback signals are made available to a vehicle driver. Fourth, the connector port 28 may function as an external programming interface through which software containing algorithms and data may be transmitted for use by controlled systems. Fifth, the connector port 28 may function as an information conduit through which sensor information and other information is made available to a vehicle driver. The connector port 28 may thus function as a communications and power "umbilical" port through which all communications between the vehicle and the attached driver control input device 11 and other attachments to the chassis are transmitted. The connector port 28 is essentially an electrical connector. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

The steering system 20 is operatively connected to the front wheels 16, 17 (but may be connected to rear wheels). Preferably, the steering system 20 is responsive to non-mechanical control signals. In the preferred embodiment, the steering system 20 is by-wire. A by-wire system is characterized by control signal transmission in electrical form. In the context of the present invention, "by-wire" systems, or systems that are controllable "by-wire", include systems configured to receive control signals in electronic form via a control signal receiver and respond in conformity to the electronic control signals.

Figure 2:
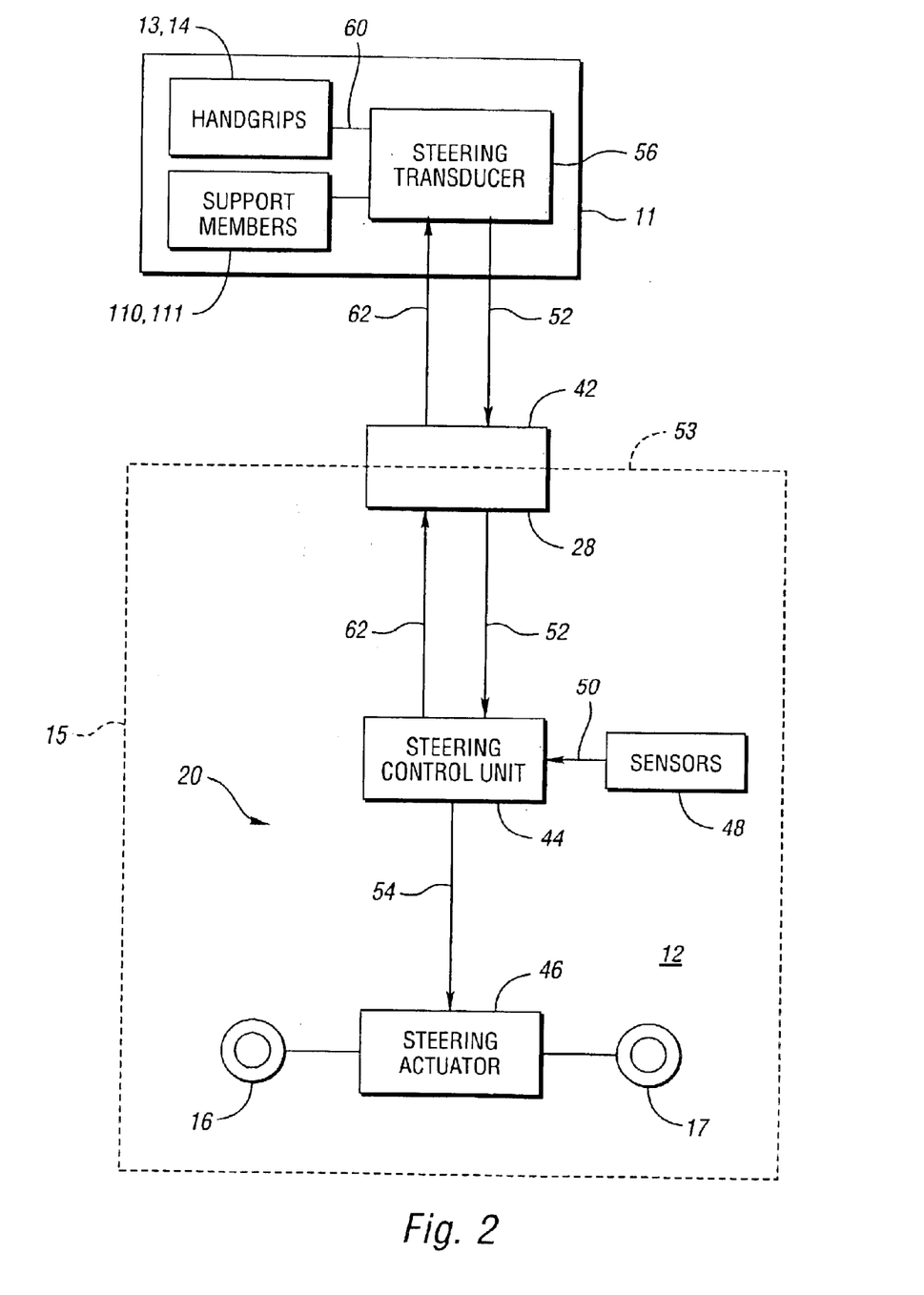
FIG. 2 is a schematic illustration of a steering system for use with the vehicle of FIG. 1.

FIG. 2 is a schematic illustration of a steering system for use with the mobility system of FIG. 1. The by-wire steering system 20 of the preferred embodiment includes a steering control unit 44, and a steering actuator 46. Sensors 48 are located on the vehicle 10 and transmit sensor signals 50 carrying information concerning the state or condition of the vehicle and its component systems. The sensors 48 may include position sensors, velocity sensors, acceleration sensors, pressure sensors, force and torque sensors, flow meters, temperature sensors, etc. The steering control unit 44 receives and processes sensor signals 50 from the sensors 48 and electrical steering control signals 52 from the connector port 28, and generates steering actuator control signals 54 according to a stored algorithm. A control unit typically includes a microprocessor, ROM and RAM and appropriate input and output circuits of a known type for receiving the various input signals and for outputting the various control commands to the actuators. Sensor signals 50 may include yaw rate, lateral acceleration, angular wheel velocity, tie-rod force, steering angle, chassis velocity, etc.

The steering actuator 46 is operably connected to the front wheels 16, 17 and configured to adjust the steering angle of the front wheels 16, 17 in response to the steering actuator control signals 54. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 46 is an electric drive motor configured to adjust a mechanical steering rack.

Referring to FIG. 2, the preferred embodiment of the vehicle is configured such that it is steerable by any source of compatible electrical steering control signals 52 connected to the connector port 28. The connector port 28 interfits with the connector 42 at the connector interface 53. FIG. 2 depicts a steering transducer 56 located within the driver control input device 11, operatively connected between the hand grips 13, 14 and the support members 110, 111, and connected to a complementary connector 42. Transducers convert the mechanical control signals of a vehicle driver to non-mechanical control signals. When used with a by-wire system, transducers convert the mechanical control signals to electrical control signals usable by the by-wire system. Transducers utilize sensors, typically position and force sensors, to convert the mechanical input to an electrical signal.

The complementary connector 42 is coupled with the connector port 28 of the connector interface 53. The steering transducer 56 converts vehicle driver-initiated mechanical steering control signals 60 to electrical steering control signals 52 which are transmitted via the connector port 28 to the steering control unit 44. The steering transducer 56 may include, for example, a curved rack and pinion with an optical sensor to sense the position of the pinion along the curved rack as the hand grips are pivoted with respect to the support members 110, 111. A motor may also be included and operatively engaged with the pinion to provide force feedback to the driver. In the preferred embodiment, the steering control unit 44 generates steering feedback signals 62 for use by a vehicle driver and transmits the steering feedback signals 62 through the connector port 28. Some of the sensors 48 monitor linear distance movement of a steering rack and vehicle speed. This information is processed by the steering control unit 44 according to a stored algorithm to generate the steering feedback signals 62.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 22 is mounted to the chassis 15 and is operably connected to the wheels 16, 17, 18, 19. The braking system 22 is configured to be responsive to non-mechanical control signals. In the preferred embodiment, the braking system 22 is by-wire, as depicted schematically in FIG. 3, wherein like reference numbers refer to like components from FIG. 2. Sensors 48 transmit sensor signals 50 carrying information concerning the state or condition of the vehicle and its component systems to a braking control unit 64. The braking control unit 64 is connected to the connector port 28 and is configured to receive electrical braking control signals 66 via the connector port 28. The braking control unit 64 processes the sensor signals 50 and the electrical braking control signals 66 and generates braking actuator control signals 68 according to a stored algorithm. The braking control unit 64 then transmits the braking actuator control signals 68 to braking actuators 70, 72, 74, 76 which act to reduce the angular velocity of the wheels 16, 17, 18, 19. Those skilled in the art will recognize the manner in which the braking actuators 70, 72, 74, 76 act on the wheels 16, 17, 18, 19. Typically, actuators cause contact between friction elements, such as pads and disc rotors. Optionally, an electric motor may function as a braking actuator in a regenerative braking system.

Figure 3:
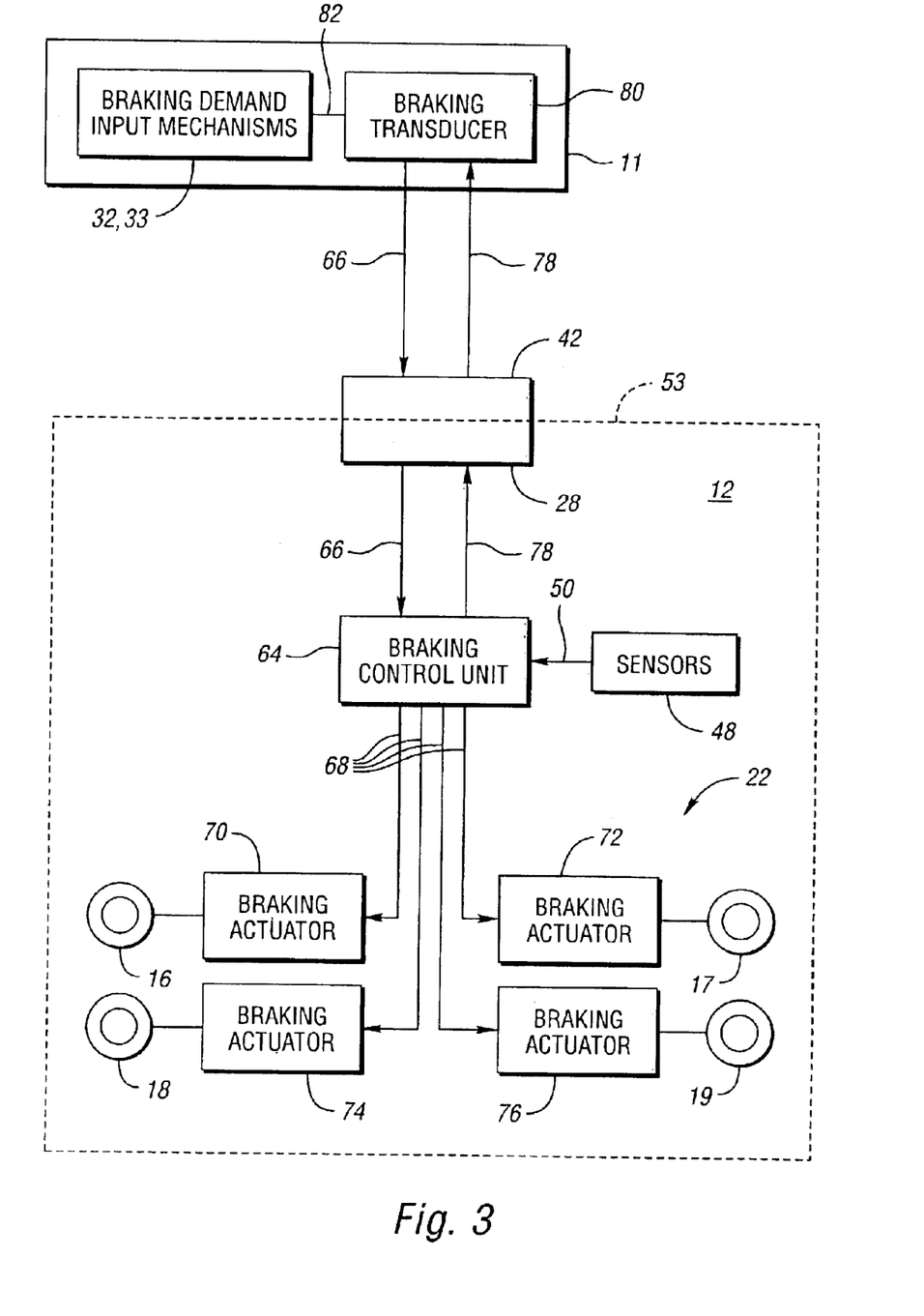
FIG. 3 is a schematic illustration of a braking system for use with the vehicle of FIG. 1.

The braking control unit 64 may also generate braking feedback signals 78 for use by a vehicle driver and transmit the braking feedback signals 78 through the connector port 28. In the preferred embodiment, the braking actuators 70, 72, 74, 76 apply force through a caliper to a rotor at each wheel. Some of the sensors 48 measure the applied force on each caliper. The braking control unit 64 uses this information to ensure synchronous force application to each rotor.

The preferred embodiment of the vehicle is configured such that the braking system 22 is responsive to any source of compatible electrical braking control signals 66. A braking transducer 80 is located in the driver control input device 11 operatively connected with the braking demand input mechanisms 32, 33, and connected to a complementary connector 42 interfitted with the connector port 28 at the connector interface 53. The braking transducer 80 converts vehicle driver-initiated mechanical braking control signals 82 into electrical form and transmits the electrical braking control signals 66 to the braking control unit via the connector port 28. The braking transducer 80 includes sensors that measure both the rate of applied pressure and the amount of applied pressure to the braking demand input mechanisms 32, 33, thereby converting mechanical braking control signals 82 to electrical braking control signals 66. The braking control unit 64 processes both the rate and amount of applied pressure to provide both normal and panic stopping.

Examples of brake-by-wire systems are described in U.S. Pat. No. 5,366,281, issued Nov. 22, 1994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Figure 4:
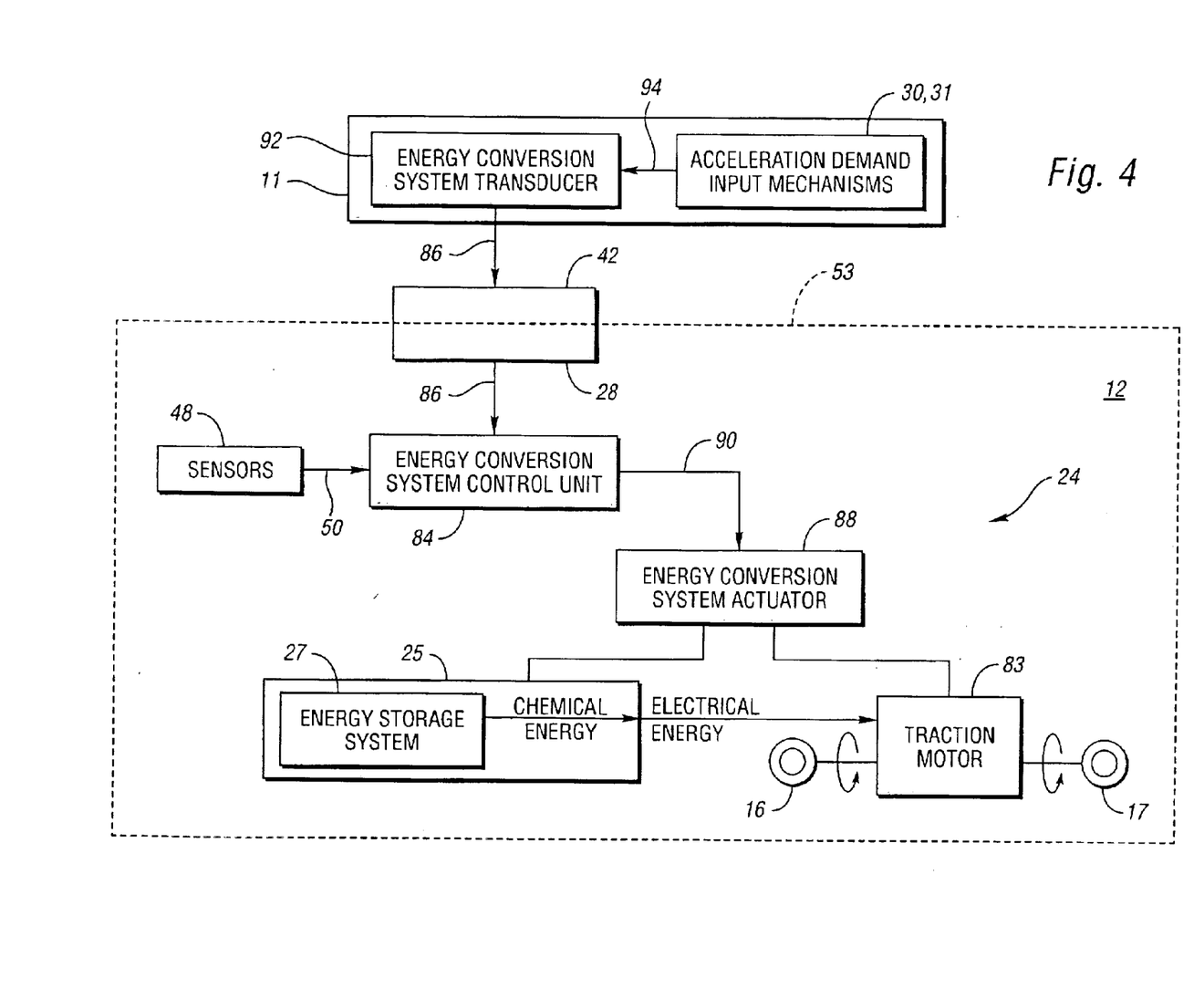
FIG. 4 is a schematic illustration of an energy conversion system for use with the vehicle of FIG. 1.

FIG. 4 is a schematic illustration of the energy conversion system 24 referenced in FIG. 1. The energy conversion system 24 includes an energy converter 25 that converts the energy stored in an energy storage system 27 to electrical energy that propels the vehicle 12. In the preferred embodiment, the energy converter 25 is operably connected to a traction motor 83. The energy converter 25 converts chemical energy into electrical energy, and the traction motor 83 converts the electrical energy to mechanical energy, and applies the mechanical energy to rotate the front wheels 16, 17. Those skilled in the art will recognize many types of energy converters 25 that may be employed within the scope of the present invention.

The energy conversion system 24 is configured to respond to non-mechanical control signals. The energy conversion system 24 of the preferred embodiment is controllable by-wire, as depicted in FIG. 4. An energy conversion system control unit 84 is connected to the connector port 28 from which it receives electrical energy conversion system control signals 86, and sensors 48 from which it receives sensor signals 50 carrying information about various vehicle conditions. In the preferred embodiment, the information conveyed by the sensor signals 50 to the energy conversion system control unit 84 includes vehicle velocity, electrical current applied, rate of acceleration of the vehicle, and motor shaft speed to ensure smooth launches and controlled acceleration. The energy conversion system control unit 84 is connected to an energy conversion system actuator 88, and transmits energy conversion system actuator control signals 90 to the energy conversion system actuator 88 in response to the electrical energy conversion system control signals 86 and sensor signals 50 according to a stored algorithm. The energy conversion system actuator 88 acts on the energy conversion system 24 or traction motor 83 to adjust energy output. Those skilled in the art will recognize the various methods by which the energy conversion system actuator 88 may adjust the energy output of the energy conversion system.

An energy conversion system transducer 92 is located in the driver control input device 11, operatively associated with the acceleration demand input mechanisms 30, 31, and connected to a complementary connector 42 engaged with the connector port 28 at the connector interface 53. The energy conversion system transducer 92 is configured to convert mechanical energy conversion system control signals 94 to electrical energy conversion system control signals 86.

Figure 5:
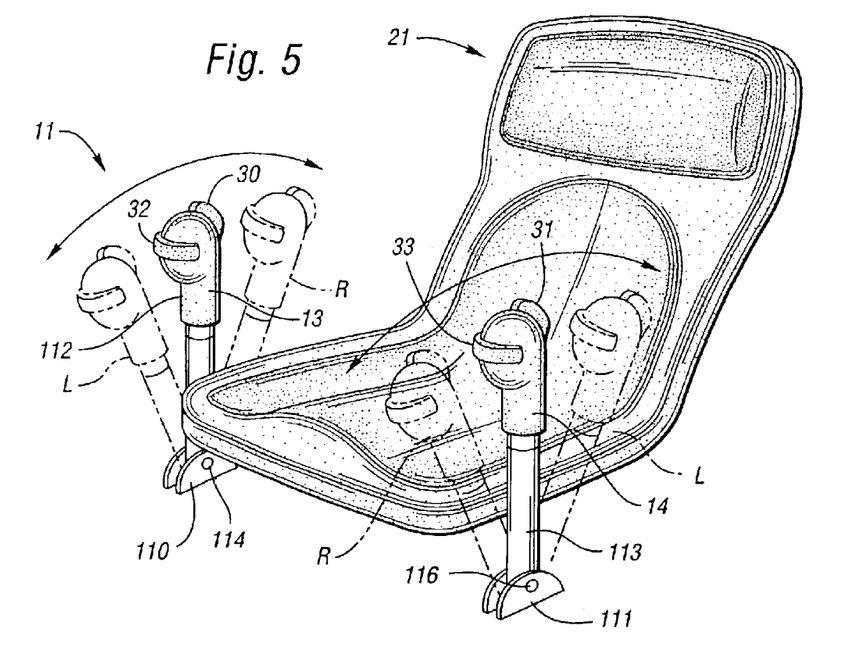
FIG. 5 is an enlarged schematic perspective view of the driver control input device of FIG. 1, with various steering positions shown in phantom.

FIG. 5 shows an enlarged view of the seat 21 and control input device 11 shown in FIG. 1. As shown, the posts 112, 113 are pivotally connected to the support members 110, 111 at the pivot joints 114, 116, respectively. A transducer, such as the transducer 56 illustrated schematically in FIG. 2, is positioned at each of the pivot joints 114, 116 to translate pivotal motion of the posts 112, 113 into non-mechanical steering signals to be sent to the steer-by-wire system of the vehicle.

The phantom illustrations in FIG. 5 show exemplary turning positions of the hand grips 13, 14. When the hand grips 13, 14 are moved to the phantom positions "R", right turn steering signals are generated. Similarly, when the hand grips 13, 14 are moved to the phantom positions "L", left turn steering signals are generated. As illustrated, the posts 112, 113 are sufficiently linked together or synchronized such that forward movement of one hand grip 13, 14 results in an equal and opposite rearward movement of the other hand grip 13, 14, and vice versa.

As shown in FIG. 5, the accelerator demand input mechanisms 30, 31 are configured as accelerator buttons. They may alternatively be levers, compression sensors, or other devices. The acceleration buttons 30, 31 are shown positioned on an upper portion of the first and second hand grips 13, 14 for operation by thumb, but these devices may be positioned anywhere on the hand grips.

The braking demand input mechanisms 32, 33 are also configured as buttons which are positioned on a forward surface of the first and second hand grips 13, 14. These mechanisms also may be configured as any type of transducer, including a compression sensor, rheostat, lever, etc., and may be positioned anywhere on the hand grips.

Arm rests may be positioned on the seat 21 to enhance comfort and convenience for the driver while gripping the hand grips 13, 14.

Figure 6:
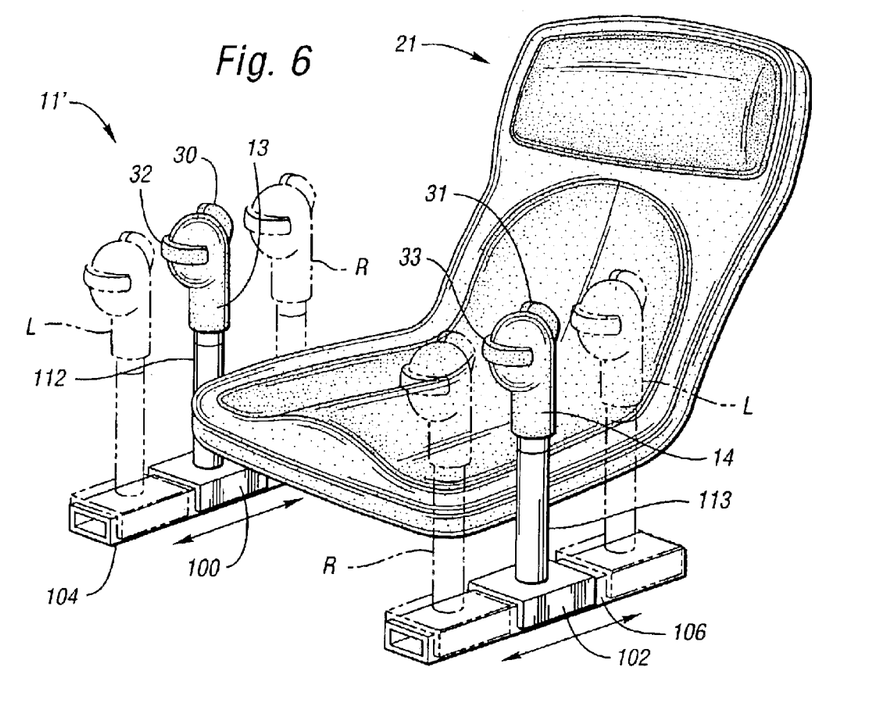
FIG. 6 is a schematic perspective view of a driver control input device in accordance with an alternative embodiment of the invention, with various steering positions shown in phantom.

FIG. 6 shows a perspective view of a control input device in accordance with an alternative embodiment of the invention, wherein like reference numerals are used to refer to like components from FIG. 5. As shown, the control input device 11' includes the hand grips 13, 14 supported on vertical posts 112, 113, and including accelerator demand input mechanisms 30, 31 and braking demand input mechanisms 32, 33, like the embodiment shown in FIG. 5. This embodiment differs from the FIG. 5 embodiment in that the support posts 112, 113 are slidably mounted for sliding movement in the forward and rearward directions, as opposed to being pivotally mounted as shown in FIG. 5. Accordingly, the posts 112, 113 are each mounted on a slider 100, 102, respectively, for forward and rearward sliding movement along the tracks 104, 106. The sliders 100, 102 are configured to support the posts 112,113 in a vertical orientation and to enable the posts 112, 113 to slide forwardly and rearwardly with respect to the tracks 104, 106. The sliders 100, 102 preferably include rollers, bearings or other devices to allow such sliding movement with respect to the tracks 104, 106.

A transducer such as the steering transducer 56 illustrated schematically in FIG. 2, is preferably operatively connected between the slider 100 and track 104, and between the slider 102 and track 106 to translate mechanical sliding motion of the sliders 100, 102 into non-mechanical steering signals. For example, the tracks 104, 106 may each include an elongated rack, and the sliders 100, 102 would each include a pinion engaged with the respective rack and movable there along. Optical sensors may be provided to sense the position of the pinions with respect to the racks in a manner to generate the non-mechanical steering signals.

As illustrated schematically in FIG. 6, when the hand grips 13, 14 are moved to the phantom positions "R" right turn steering signals are generated, and when the hand grips 13, 14 are moved to the phantom positions "L" shown in FIG. 6, left turn steering signals are generated.

The sliders 100, 102 are sufficiently linked or synchronized such that forward movement of one of the hand grips results in an equal and opposite rearward movement of the other hand grip.

The steering, braking and acceleration systems described herein may be redundant or back-up systems to other vehicle steering, braking or acceleration systems. Also, the controls are configured redundantly such that a vehicle may be driven by one hand (i.e. the left side hand grip and related control features are redundant to the right side hand grip and related control features, etc.).

The invention also contemplates that the various features shown in the figures for different embodiments may be combined with or exchanged with features shown in other embodiments.

While the best modes for carrying out the invention have been described in detail, those familiar with the art to which this invention relates will recognize various alternative designs and embodiments for practicing the invention within the scope of the appended claims.

What is claimed is:

1. A driver control input device comprising:
left and right control posts each having a hand grip, said control posts being movable forwardly and rearwardly and being sufficiently linked together such that forward movement of one control post will result in an opposite rearward movement of the other control post to facilitate sending non-mechanical steering signals to a steer-by-wire system to which the control input device is attached.

2. The driver control input device of claim 1, wherein at least one of said hand grips includes an accelerator demand input mechanism to facilitate sending acceleration signals to an energy conversion system.

3. The driver control input device of claim 1, wherein at least one of said first and second hand grips includes a braking demand input mechanism to facilitate sending braking signals to a brake-by-wire system.

4. The driver control input device of claim 1, wherein said left and right control posts are pivotally mounted for pivotal movement in said forward and rearward directions, and include a transducer to convert said pivotal movement into steering signals.

5. The driver control input device of claim 1, wherein said left and right control posts are slidably mounted for sliding movement in said forward and rearward directions, and are operatively engaged with a transducer to convert said sliding movement into steering signals.

6. The driver control input device of claim 2, wherein said accelerator demand input mechanism comprises an accelerator button positioned on an upper portion of said hand grips.

7. The driver control input device of claim 3, wherein said braking demand input mechanism comprises a braking button positioned on a forward portion of said hand grips.

8. The driver control input device of claim 5, wherein said left and right control posts are each slidably mounted on a track.

9. The driver control input device of claim 6, wherein said accelerator buttons are positioned for operation by a user's thumb.

10. The driver control input device of claim 1, further comprising a driver's seat positioned between said left and right control posts.

11. A driver control input device for a vehicle comprising:
left and right control posts each having a hand grip, said control posts being movable forwardly and rearwardly and being sufficiently linked together such that forward movement of one control post will result in an equal and opposite rearward movement of the other control post to facilitate sending non-mechanical steering signals to a steer-by-wire system on a vehicle to which the control input device is attached;
wherein at least one of said hand grips includes an accelerator demand input mechanism to facilitate sending acceleration signals to an energy conversion system of the vehicle; and
at least one of said first and second hand grips includes a braking demand input mechanism to facilitate sending braking signals to a brake-by-wire system of the vehicle.

12. The driver control input device of claim 11, wherein said left and right control posts are pivotally mounted for pivotal movement in said forward and rearward directions, and are operatively engaged with a transducer to convert said pivotal movement into steering signals.

13. The driver control input device of claim 11, wherein said left and right control posts are slidably mounted for sliding movement in said forward and rearward directions, and are operatively engaged with a transducer to convert said sliding movement into steering signals.

14. The driver control input device of claim 11, wherein said accelerator demand input mechanism comprises an accelerator button positioned on an upper portion of said hand grips.

15. The driver control input device of claim 11, wherein said braking demand input mechanism comprises a braking button positioned on a forward portion of said hand grips.

16. The driver control input device of claim 13, wherein said left and right control posts are each slidably mounted on a track.

17. The driver control input device of claim 14, wherein said accelerator buttons are positioned for operation by a user's thumb.

18. The driver control input device of claim 11, further comprising a driver's seat positioned between said left and right control posts.

19. A vehicle comprising:
a chassis;
at least three wheels operable with respect to the chassis;
a steering system mounted with respect to the chassis and responsive to non-mechanical control signals;
a braking system mounted with respect to the chassis and responsive to non-mechanical control signals;
an energy conversion system mounted with respect to the chassis and responsive to non-mechanical control signals;
left and right control posts each having a hand grip, said control posts being movable forwardly and rearwardly and being sufficiently linked together such that forward movement of one control post will result in an equal and opposite rearward movement of the other control post to facilitate sending non-mechanical steering signals to said steering system;
at least one of said hand grips having an accelerator demand input mechanism to facilitate sending acceleration signals to said energy conversion system; and
at least one of said first and second hand grips having a braking demand input mechanism to facilitate sending braking signals to said braking system.

* * * * *